United States Patent Office 3,461,099
Patented Aug. 12, 1969

3,461,099
AMINO-ETHYLATED NOVOLAKS
Thaddeus M. Muzyczko, Melrose Park, Samuel Shore, Roselle, and Jerome A. Martin, Chicago, Ill., assignors to The Richardson Company, Melrose Park, Ill., a corporation of Ohio
No Drawing. Filed Nov. 4, 1966, Ser. No. 591,985
Int. Cl. C08g 5/18, 33/08
U.S. Cl. 260—59          8 Claims

ABSTRACT OF THE DISCLOSURE

Polymeric amines produced by reacting a novolak having a plurality of phenolic OH groups and an imine such as propylene imine. These products are useful for such purposes as epoxy curing agents and corrosion inhibitors.

---

This invention relates to polymeric aromatic alkyl amines and more particularly to polyamines derived from novolaks. These products are useful as corrosion inhibitors, as curing agents for epoxy, phenolic and urethane resins, and as tackifiers for paper and wood compositions. Moreover, these products readily form polymeric salts, quaternaries, and the like.

The polymeric aromatic amines are the reaction products of a novolak and an imine of the formula:

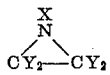

wherein X and Y each may be hydrogen, alkyl, aryl, and mixtures thereof.

Novolaks are well known in the phenolic resin field and are described in Phenolic Resins by David F. Gould, copyright 1959, as a permanently fusible condensation product obtained in an acid medium by reacting an aldehyde such as formaldehyde with a molar excess of a phenolic compound such as phenol, cresols and xylenols. The resultant novolak is characterized by a plurality of phenolic OH groups and solubility in common solvents. Of particular interest to this invention are novolaks with molecular weights in the range of about 300 to 2000 and advantageously about 1200 to 1500. Although not essential, it is usually advantageous when the novolak has little, if any, hydroxy methyl groups.

The above-described imine has the formula:

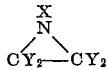

wherein X and Y are as described above. Advantageously, Y is hydrogen or alkyl as represented by such imines as ethylene imine, monoalkyl ethylene imine, dialkyl ethylene imine, trialkyl ethylene imine, and tetraalkyl ethylene imine. Also advantageously, X is hydrogen or alkyl. Illustrative alkyls are the lower alkyls with 1–5 carbon atoms which may be completely hydrocarbon or may contain hydroxy, alkoxy, or chloro groups. Advantageously, they are primarily hydrocarbons devoid of groups which cause competing reactions, and include the aryl alkylenes such as phenyl ethylene as well as the alkyls such as methyl, ethyl, propyl, butyl, pentyl, and the like. Ethylene imine and the monoalkyl and dialkyl imines are preferred.

The reaction is carried out with the imine being present in an equivalent ratio to the novolak of at least 1:1 based on the phenolic OH content of the novolak. Advantageously, the equivalent ratio of novolak to imine is in the range of about 1:1 to 1:3. The reaction temperature is somewhat dependent on the particular imine. In general, temperature of about 100–150° C. provides satisfactory results. Solvents such as benzene, toluene or other aromatic solvents, or aliphatic or chlorinated solvents can be used in the reaction medium. With a reaction utilizing propylene imine and a solvent such as toluene, the product remains dissolved in the solvent. Vacuum stripping can be subsequently used to further isolate the product.

The reaction results in the formation of products as:

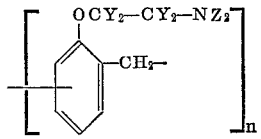

wherein Y is as described above, $n$ is an integer above 1, and one Z represents hydrogen, the groups previously defined with respect to X, or the substituted products when additional imine reacts with available hydrogen on the amino group. Since the other Z is initially hydrogen from the phenolic OH, it represents hydrogen or a substituted product. In these products, it is not uncommon to have primary, secondary and tertiary amines in the aromatic polymer.

The following examples illustrate some of the embodiments of this invention. It is to be understood that these are for illustrative purposes only and do not purport to be wholly definitive to conditions or scope.

Example I

A one liter, three neck, round bottom reaction flask was fitted with a water cooled reflux condenser, thermometer and dropping funnel. Agitation was supplied with a motor driven paddle agitator. The flask was charged with 64.0 grams of novolak resin (molecular weight=1200–1500) and 300.0 grams of toluene. This mixture was heated with an electric heating mantle until the resin was completely dissolved (70° C.—1 hour). A solution of 69.0 grams of propylene imine in 100.0 grams of toluene was added via dropping funnel at 50 to 105° C. over a one hour period. The equivalent ratio of novolak to imine was approximately 1:2.

This reaction solution was refluxed for 30 hours, after which the unreacted propylene imine and toluene were removed by vacuum distillation (115° C. at 20 mm. Hg). The residue was an amber brittle, tacky resin which was dissolved in petroleum ether (300 ml.) and washed with distilled water until the aqueous phase was neutral, to remove any by-product imine homopolymers. The petroleum ether solution was concentrated on a steam bath and further dried in a vacuum oven to constant weight.

The product was not soluble in water but was soluble in dilute HCl, dilute $H_2SO_4$ and acetone. Analysis showed: 8.20% N, 40.0% primary amine, 41.3% secondary amine, 18.7% tertiary amine by weight. Infrared showed a characteristic ether absorption at 1110 cm.$^{-1}$ and, a loss of phenolic OH absorptions at 3300 cm.$^{-1}$. The softening point of this amber resin was 37–40° C.

Example II

A mixture of 15.0 grams of epoxy resin and 5.0 grams of product of Example I was mixed in an aluminum planchet at 60° C. This solution was then cured in a 100° C. oven for six hours. The resultant casting was a hard clear amber resin that was not tacky and had a Barcol hardness of 60.

Example III

Ten grams of product of Example I (inhibitor A) and ten grams of propargyl alcohol was mixed for two hours at 30° C. This composition is to be known as inhibitor B. Sample strips of 1020 steel, 1010 steel and 316 stainless steel were cleaned with detergent, rinsed with acetone, dried and placed in 150 ml. of 10% HCl for six hours at 150° F. Similar samples were placed in 150 ml.—10% HCl solutions that were inhibited with product A. The results are shown below.

CORROSION TESTS

[Ferrous metal coupons totally immersed in 150 ml. of 10% HCl (by weight) for six hours at 150° F.]

| Inhibitor | Percent inhibitor (by weight) | Ferrous coupon | Coupon surface area, in.² | Corrosion rate, lbs./ft.²- 24 hrs. | Percent inhibitor |
|---|---|---|---|---|---|
| None | | 1020 steel | 7.07 | 1.8030 | |
| A | .1 | do | 7.07 | .0190 | 97.02 |
| B | .1 | do | 7.07 | .0140 | 99.22 |
| None | | 1010 steel | 6.47 | .6955 | |
| A | .1 | do | 6.47 | .0020 | 97.07 |
| None | | 316 S.S. | 6.47 | .1346 | |
| A | .2 | 316 S.S. | 6.47 | .0079 | 99.04 |

The above results demonstrate the effectiveness of the polymeric aromatic amine in corrosion inhibition both as to the primary additive and in combination with propargyl alcohol.

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:
1. A polymeric aromatic alkyl amine as the reaction product of a novolak, said novolak consisting of the condensation product of a phenolic compound and an aldehyde and having a plurality of phenolic OH groups, and an imine with the formula

wherein X and Y are each selected from the group consisting of hydrogen, alkyl, aryl and mixtures thereof, the imine being present in an equivalent ratio to the novolak of at least 1:1 based on the phenolic OH content of the novolak.

2. The polymeric amine of claim 1 wherein at least one Y is hydrogen.

3. The polymeric amine of claim 1 wherein from 1–2 Y's are alkyl and the remaining Y's are hydrogen.

4. The polymeric amine of claim 1 wherein X is hydrogen.

5. The polymeric amine of claim 1 wherein X is alkyl.

6. The polymeric amine of claim 3 wherein X is hydrogen.

7. The polymeric amine of claim 2 wherein the novolak and imine are present in an equivalent ratio in the range of about 1:1 to 1:3 based on the phenolic OH content of the novolak.

8. The polymeric amine of claim 2 wherein the imine is propylene imine and the reaction is at a temperature in the order of about 100–150° C. with an equivalent ratio of about 1:2.

References Cited

UNITED STATES PATENTS

| 2,296,225 | 9/1942 | Ulrich | 260—239 |
| 3,028,349 | 4/1962 | Rowland et al. | 260—24 |
| 3,329,674 | 7/1967 | Bulbenko et al. | 260—239 |
| 3,355,437 | 11/1967 | Tesoro et al. | 260—77.5 |

HOWARD SCHAIN, Primary Examiner

U.S. Cl. X.R.

117—132; 252—392; 260—2, 29, 33, 51, 831